(12) United States Patent
Watanabe et al.

(10) Patent No.: US 11,301,188 B2
(45) Date of Patent: Apr. 12, 2022

(54) INFORMATION PROCESSING APPARATUS, INFORMATION PROCESSING METHOD, AND PRINTING APPARATUS

(71) Applicant: CANON KABUSHIKI KAISHA, Tokyo (JP)

(72) Inventors: Tomoyuki Watanabe, Tokyo (JP); Masao Maeda, Kanagawa (JP); Hirokazu Ishii, Kanagawa (JP); Yoshihiro Yamagishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/078,671

(22) Filed: Oct. 23, 2020

(65) Prior Publication Data
US 2021/0132880 A1    May 6, 2021

(30) Foreign Application Priority Data

Nov. 1, 2019   (JP) .............................. JP2019-199898

(51) Int. Cl.
*G06F 3/12*   (2006.01)

(52) U.S. Cl.
CPC .......... *G06F 3/1242* (2013.01); *G06F 3/1208* (2013.01)

(58) Field of Classification Search
CPC ........ G06F 3/1242; G06F 3/1208; H04N 1/00
See application file for complete search history.

(56) References Cited

U.S. PATENT DOCUMENTS

| 5,576,950 | A  | * | 11/1996 | Tonomura | .......... | H04N 1/00283 |
| | | | | | | 386/200 |
| 8,253,967 | B2 | | 8/2012 | Kitamaru | | |
| 2007/0035771 | A1 | * | 2/2007 | Kitamaru | .......... | H04N 1/00413 |
| | | | | | | 358/1.18 |
| 2012/0113475 | A1 | * | 5/2012 | Sugiyama | .......... | H04N 1/00196 |
| | | | | | | 358/1.18 |
| 2015/0093034 | A1 | * | 4/2015 | Momoki | ............ | H04N 1/00196 |
| | | | | | | 382/224 |
| 2018/0220098 | A1 | * | 8/2018 | Hayakawa | ............. | H04N 1/387 |
| 2019/0102398 | A1 | * | 4/2019 | Hayakawa | ........... | H04N 1/3873 |

FOREIGN PATENT DOCUMENTS

JP          4795149 B2    10/2011

* cited by examiner

*Primary Examiner* — Juan M Guillermety
(74) *Attorney, Agent, or Firm* — Venable LLP

(57) ABSTRACT

To provide an information processing apparatus capable of printing a plurality of additional information without non-uniformity in a case where a plurality of images and the plurality of additional information corresponding to the respective images are arranged and printed on the same print medium, an information processing apparatus prepares a template in which image arrangement frames for arranging the plurality of images individually and an additional information arrangement frame for arranging the plurality of additional information together are laid out. The information processing apparatus arranges the plurality of images in the respective image arrangement frames and arranges the plurality of additional information in the additional information arrangement frame. At this time, the information processing apparatus sets a plurality of areas for describing the respective additional information in the additional information arrangement frame based on the amounts of description of the respective additional information.

20 Claims, 12 Drawing Sheets

| |
|---|
| SHOOTING DATE AND TIME |
| MAKER NAME |
| MODEL NAME |
| RESOLUTION |
| SHOOTING DIRECTION |
| SHUTTER SPEED |
| APERTURE |
| ISO SENSITIVITY |
| FLASH |
| FOCAL LENGTH |
| COLOR SPACE |
| GPS INFORMATION |

FIG.7A

| | |
|---|---|
| SHOOTING DATE AND TIME: 2017-01-01 12:00:00 | |
| MAKER NAME: ABC COMPANY | |
| MODEL NAME: CAMERA MODEL 1 | |
| RESOLUTION: 600 | |
| SHOOTING DIRECTION: 270.00 | |
| SHUTTER SPEED: 1/4096 | |
| APERTURE: F4.0 | |
| ISO SENSITIVITY: 400 | |
| FLASH: OFF | |
| FOCAL LENGTH: 500.00 | |
| COLOR SPACE: sRGB | |
| GPS INFORMATION: | LATITUDE 35 deg 48' 8" N<br>LONGITUDE 139 deg 34' 55" E<br>ALTITUDE 12.55 m<br>TOKYO |

FIG.7B

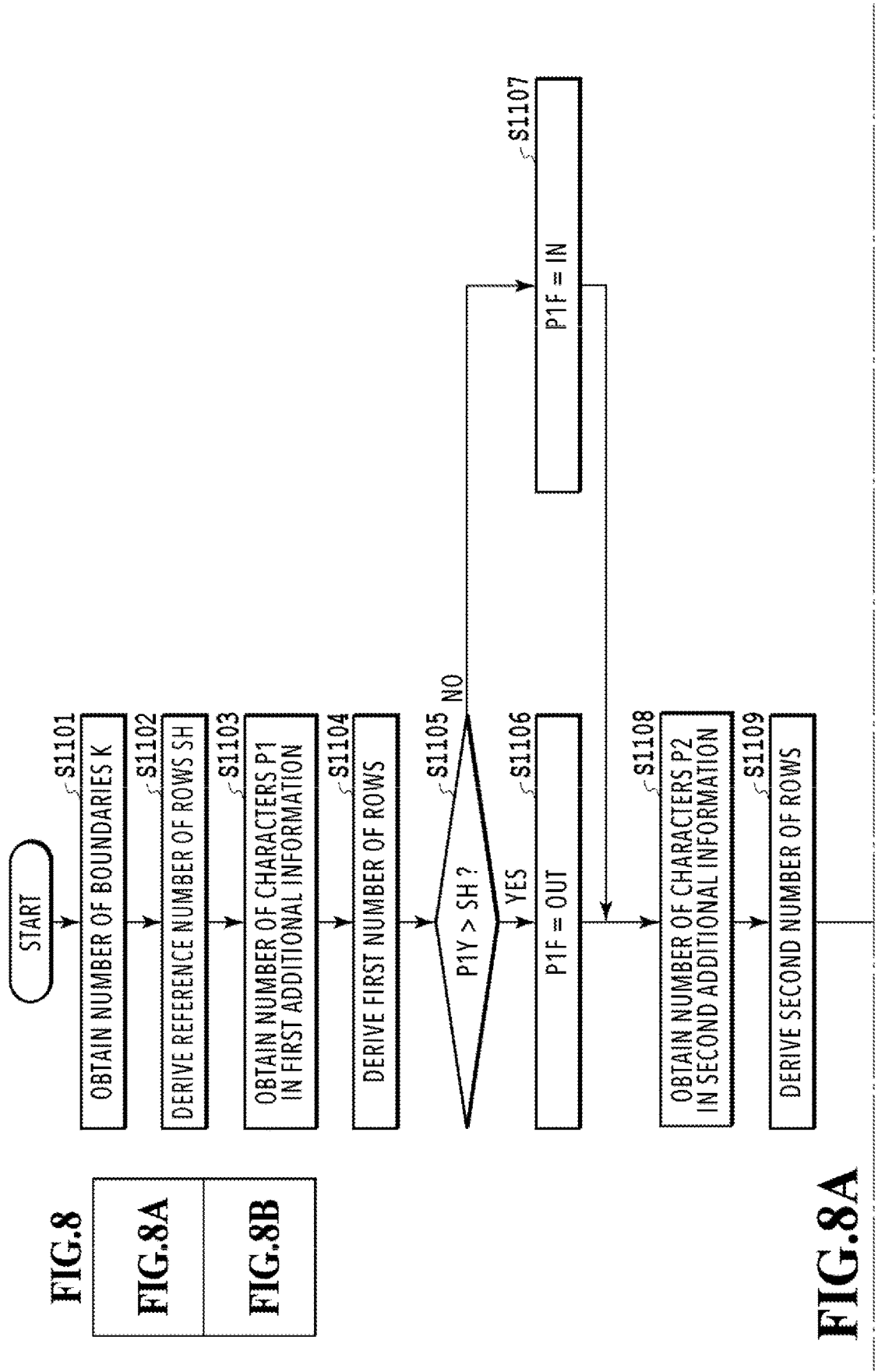

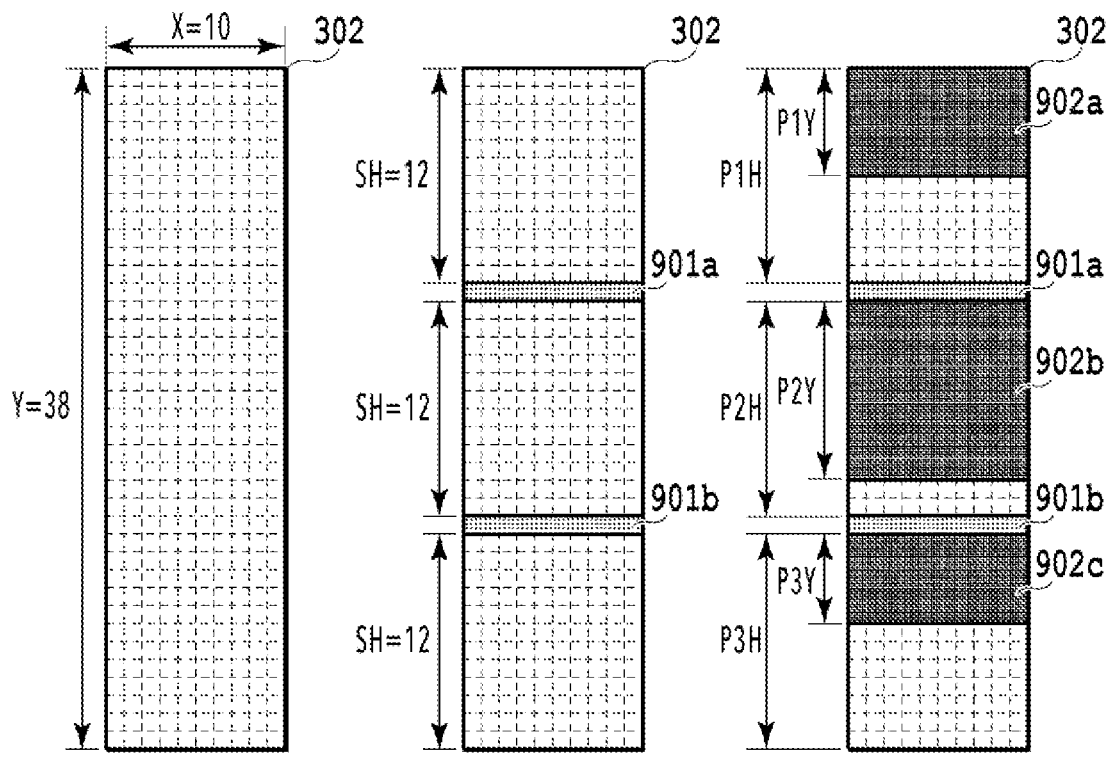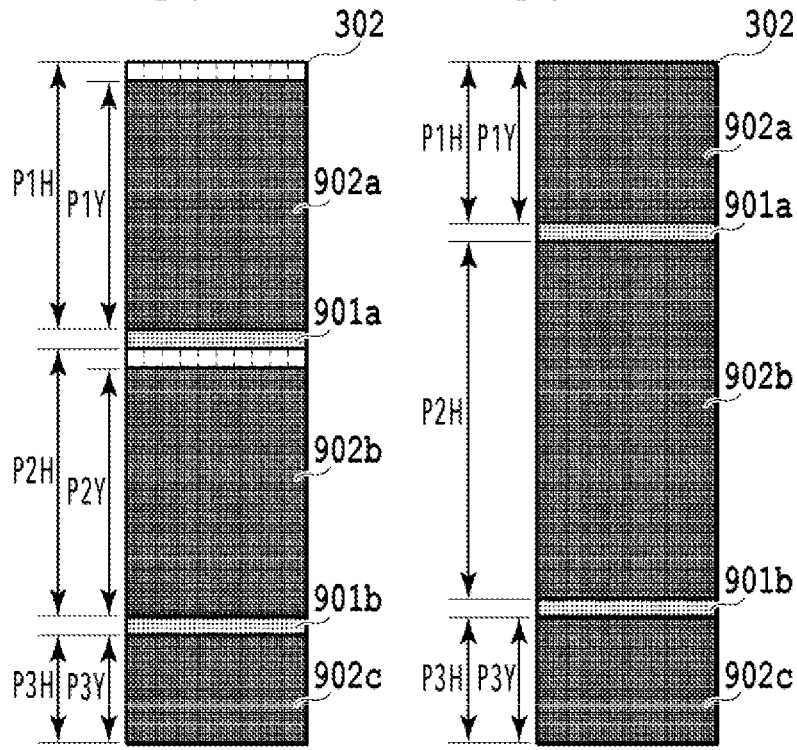
FIG.9A  FIG.9B  FIG.9C
FIG.9D  FIG.9E

| ADDITIONAL INFORMATION FLAG | | | ARRANGEMENT REFERENCE POSITION | FORMULA OF P1H FORMULA OF P2H FORMULA OF P3H | (EXAMPLE) |
|---|---|---|---|---|---|
| P1F | P2F | P3F | | | |
| IN | IN | IN | UPPER | P1H = SH<br>P2H = SH<br>P3H = SH | FIG.9C |
| | | OUT | LOWER | P1H = SH<br>P2H = P2Y<br>P3H = SH×2 − P2Y | |
| | OUT | IN | CENTER | P1H = P1Y<br>P2H = SH×3 − P1Y − P2Y<br>P3H = P3Y | FIG.9E |
| | | OUT | UPPER | P1H = P1Y<br>P2H = SH + (SH − P1Y) / 2<br>P3H = SH + (SH − P1Y) / 2 | |
| OUT | IN | IN | UPPER | P1H = SH×2 − P2Y<br>P2H = P2Y<br>P3H = SH | |
| | | OUT | CENTER | P1H = SH + (SH − P2Y) / 2<br>P2H = P2Y<br>P3H = SH + (SH − P2Y) / 2 | |
| | OUT | IN | LOWER | P1H = SH + (SH − P3Y) / 2<br>P2H = SH + (SH − P3Y) / 2<br>P3H = P3Y | FIG.9D |
| | | OUT | UPPER | P1H = SH<br>P2H = SH<br>P3H = SH | |

FIG.11

INFORMATION PROCESSING APPARATUS, INFORMATION PROCESSING METHOD, AND PRINTING APPARATUS

BACKGROUND OF THE INVENTION

Field of the Invention

The present invention relates to an information processing apparatus, an information processing method, and a printing apparatus.

Description of the Related Art

Some digital cameras and smartphones with cameras can store shooting conditions such as shooting data and time, shutter speed, and aperture as additional information on corresponding image data. Japanese Patent No. 04795149 discloses a printing method of arranging and printing images based on image data and additional information corresponding to the respective images on a print medium using a prepared template. According to Japanese Patent No. 04795149, if each additional information cannot be entirely accommodated in a prepared area, a character size is reduced such that the entire additional information can be printed.

In recent years, the contents of additional information are diversified and the amount of information is increased with increase in image quality of captured images, resolution, and use case. For example, some digital cameras can store not only conventional general shooting conditions but also various types of information such as the types of shooting camera and lens, a shooting scene, a temperature and humidity at the time of shooting, and the latitude and longitude of a shooting location using the GPS, as Exif information. There is also provided a function of adding a comment generated by a user to each image. Thus, in recent years, as the additional information increases, variation in the amount of additional information between images also becomes large.

In contrast, in a template disclosed in Japanese Patent No. 04795149, areas for describing additional information are equally allocated to respective images in advance irrespective of variation in the amount of additional information. Accordingly, there may be a case where small characters are densely described in an image with a large amount of additional information and an excessive blank is generated in an image with a small amount of information, that is, a plurality of additional information are unevenly printed on a print medium. In this case, there is a possibility that a user cannot correctly understand the additional information from the printout or the appearance of the printout is deteriorated.

SUMMARY OF THE INVENTION

The present invention has been accomplished in order to solve the above problem. Thus, the object of the invention is to provide an information processing apparatus capable of printing a plurality of additional information without non-uniformity in the case of arranging and printing a plurality of images and a plurality of additional information corresponding to the respective images on the same print medium.

In a first aspect of the present invention, there is provided an information processing method of generating print data for printing a plurality of images and a plurality of additional information associated with the respective images on a same print medium, the information processing method comprising: an obtaining step of obtaining image data on the plurality of images and the plurality of additional information; an arrangement step of preparing a template in which a plurality of image arrangement frames for arranging the plurality of images individually and an additional information arrangement frame for arranging the plurality of additional information together are laid out, arranging the plurality of images in the plurality of image arrangement frames, respectively, and arranging the plurality of additional information in the additional information arrangement frame; and a generation step of generating the print data according to a result of arranging by the arrangement step, wherein the arrangement step sets a plurality of areas for describing the respective additional information in the additional information arrangement frame based on amounts of description of the plurality of additional information and arranges the plurality of additional information in the plurality of areas, respectively.

In a second aspect of the present invention, there is provided an information processing apparatus which generates print data for printing a plurality of images and a plurality of additional information associated with the respective images on a same print medium, the information processing apparatus comprising: an obtaining unit configured to obtain image data on the plurality of images and the plurality of additional information; an arrangement unit configured to prepare a template in which a plurality of image arrangement frames for arranging the plurality of images individually and an additional information arrangement frame for arranging the plurality of additional information together are laid out, arrange the plurality of images in the plurality of image arrangement frames, respectively, and arrange the plurality of additional information in the additional information arrangement frame; and a generation unit configured to generate the print data according to a result of arranging by the arrangement unit, wherein the arrangement unit sets a plurality of areas for describing the respective additional information in the additional information arrangement frame based on amounts of description of the plurality of additional information and arranges the plurality of additional information in the plurality of areas, respectively.

In a third aspect of the present invention, there is provided a printing apparatus which prints a plurality of images and a plurality of additional information associated with the respective images on a same print medium, the printing apparatus comprising: an obtaining unit configured to obtain image data on the plurality of images and the plurality of additional information; an arrangement unit configured to prepare a template in which a plurality of image arrangement frames for arranging the plurality of images individually and an additional information arrangement frame for arranging the plurality of additional information together are laid out, arrange the plurality of images in the plurality of image arrangement frames, respectively, and arrange the plurality of additional information in the additional information arrangement frame; and a printing unit configured to print the plurality of images and the plurality of additional information on the same print medium according to a result of arranging by the arrangement unit, wherein the arrangement unit sets a plurality of areas for describing the respective additional information in the additional information arrangement frame based on amounts of description of the plurality of additional information and arranges the plurality of additional information in the plurality of areas, respectively.

Further features of the present invention will become apparent from the following description of exemplary embodiments with reference to the attached drawings.

BRIEF DESCRIPTION OF THE DRAWINGS

FIGS. 7A and 7B are diagrams showing an example of additional information stored as Exif information;

FIG. 8 is a diagram showing the relationship of FIGS. 8A and 8B;

FIG. 8A is a flowchart showing arrangement processing of additional information;

FIGS. 9A to 9E are diagrams showing a specific example of the arrangement processing of additional information;

FIG. 11 is a diagram showing a table to be referred to for determining the arrangement reference position.

DESCRIPTION OF THE EMBODIMENTS

Figure 1:
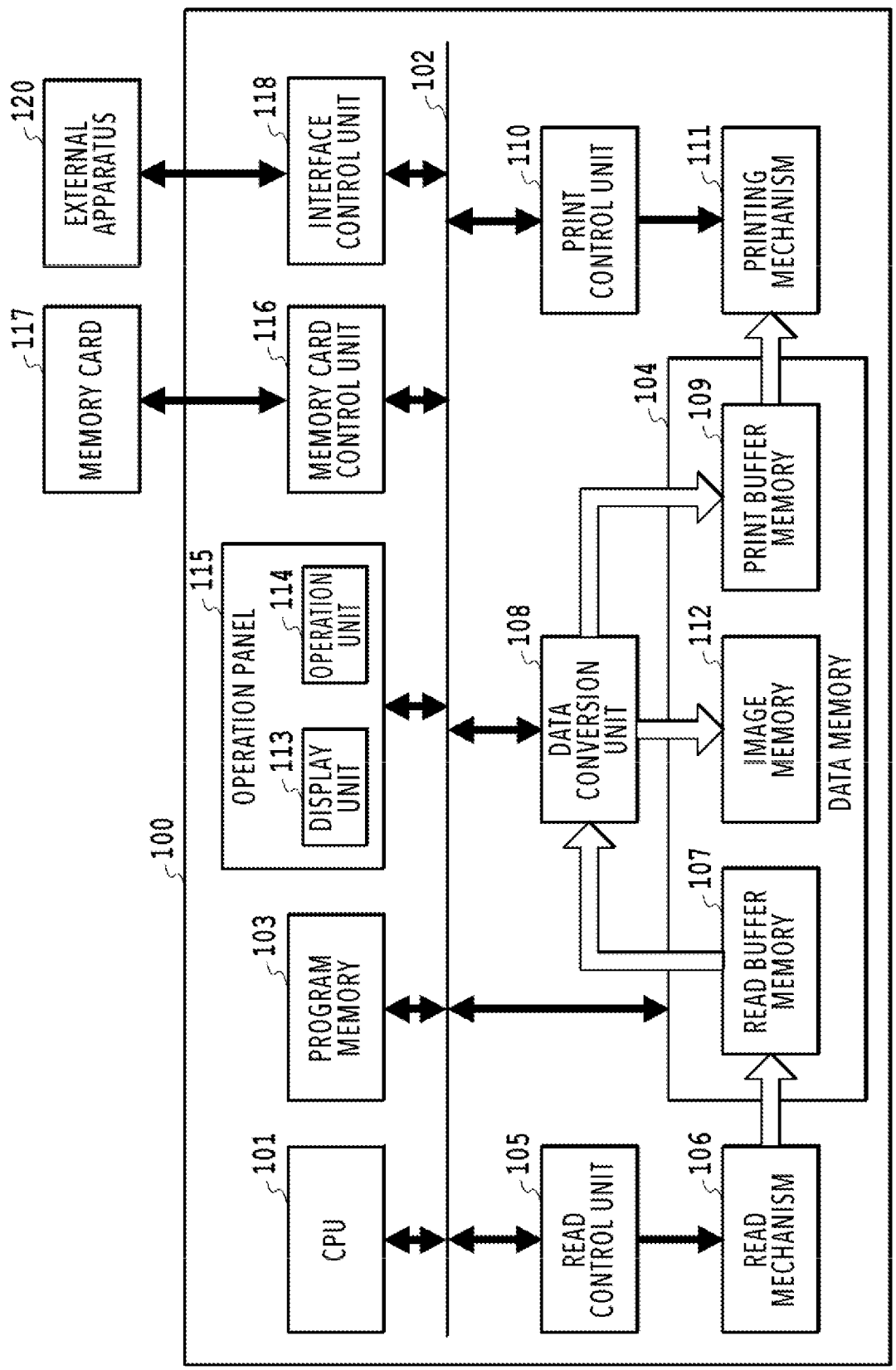
FIG. 1 is a block diagram showing a control configuration in a printing apparatus.

FIG. 1 is a block diagram showing a control configuration in a printing apparatus 100 usable as an information processing apparatus of the present invention. A CPU 101 in the form of a microprocessor controls various mechanisms via an internal bus 102 while using a data memory 104 in the form of a RAM as a work area according to a control program stored in a program memory 103 in the form of a ROM. In the present embodiment, a computer of the printing apparatus 100 is formed by the CPU 101, the program memory 103, the data memory 104 and the like.

Under instructions from the CPU 101, a read control unit 105 drives a read mechanism 106 comprising an image sensor to perform read operation and stores read image data in a read buffer memory 107 of the data memory 104.

Under instructions from the CPU 101, a memory card control unit 116 can access an externally connected memory card 117, obtain image data and additional information stored in the memory card 117, and store them in an image memory 112. The memory card control unit 116 can also transmit image data and additional information stored in the image memory 112 to the memory card 117.

Under instructions from the CPU 101, an interface control unit 118 can access an external apparatus 120 connected externally such as a PC and store image data and additional information generated in the external apparatus 120 in the image memory 112. The interface control unit 118 can also transmit image data and additional information stored in the image memory 112 to the external apparatus 120.

The printing apparatus 100 can be connected to various devices such as a digital camera as well as the devices illustrated regardless of wireless/wired and the CPU 101 may transmit/receive image data and additional information to/from these devices.

The image memory 112 is used to temporarily store and edit image data received from various devices. Image data and additional information stored in the image memory 112 are subjected to predetermined image processing and editing by a data conversion unit 108 and converted into print data printable by a printing mechanism 111. For example, in the case of copy operation, the data conversion unit 108 performs predetermined image processing for image data stored in the read buffer memory 107, generates print data printable by the printing mechanism 111, and stores the print data in the print buffer memory 109. In the case of printing an image obtained from the memory card 117, the data conversion unit 108 performs predetermined image processing for the image data stored in the image memory 112, generates print data printable by the printing mechanism 111, and stores the print data in the print buffer memory 109. The CPU 101 can appropriately adjust and allocate the capacities of the read buffer memory 107, the image memory 112, and the print buffer memory 109 in the data memory 104 depending on the operation status of the printing apparatus 100 or the like.

Under instructions from the CPU 101, a print control unit 110 drives the printing mechanism 111 and performs print operation according to print data stored in the print buffer memory 109. As a print medium, the printing apparatus 100 can use coated paper, glossy paper, and label paper for CD or DVD in addition to general plain paper.

An operation panel 115 comprises a display unit 113 equipped with an LED, LCD or the like and an operation unit 114 equipped with various keys to display the status of the printing apparatus 100 to a user and receive instructions from a user.

The printing apparatus 100 of the present embodiment can execute "index print" in which a plurality of designated images are printed on a print medium together with additional information corresponding to the respective images. The index print will be described below in detail.

Figure 2:
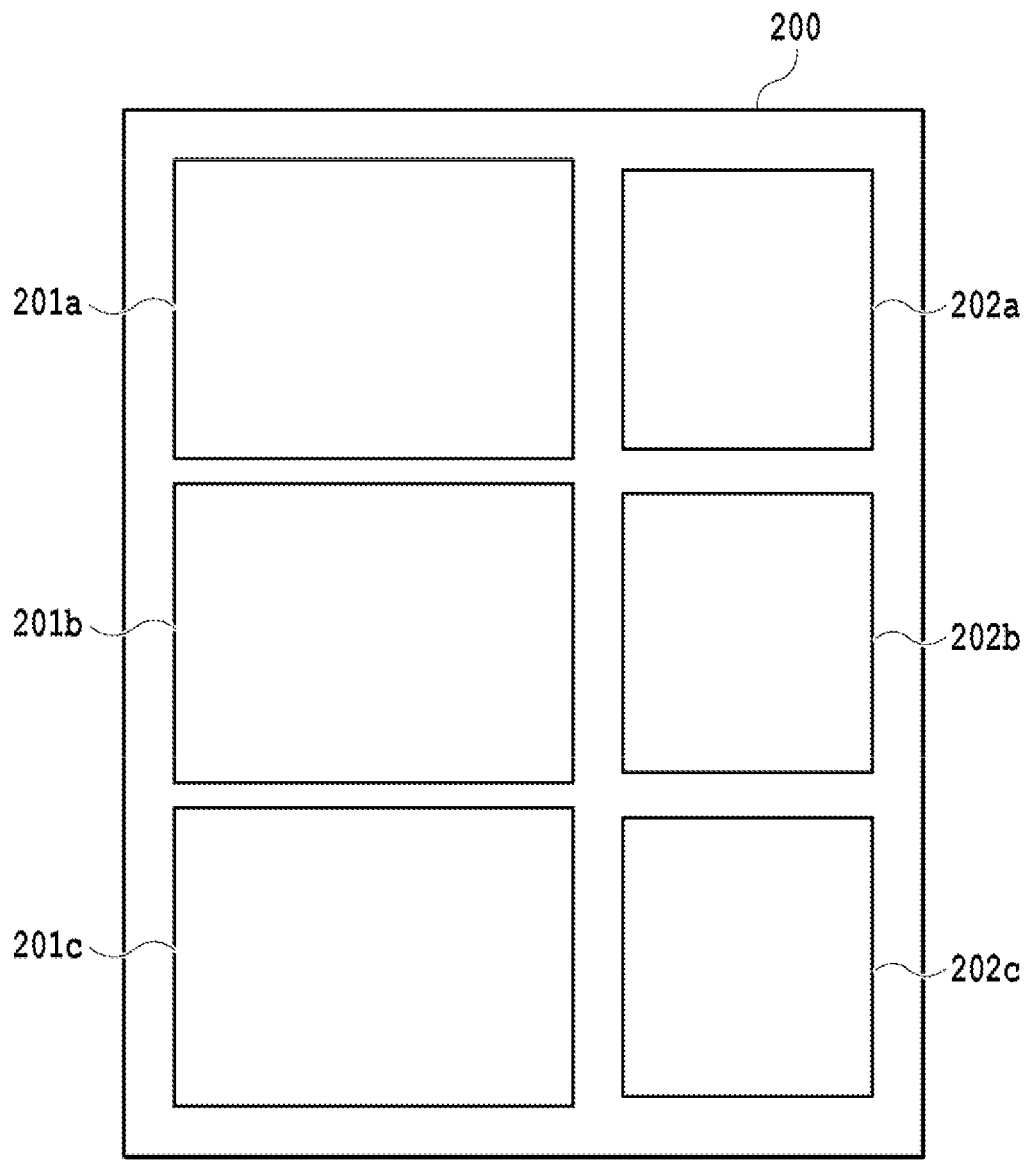
FIG. 2 is a diagram showing an example of a conventional template.

FIG. 2 is a diagram showing an example of a template in the case of conventional general index print. In this example, three images are printed together with additional information corresponding to the respective images. In the case of index print of three images, three image arrangement frames 201a to 201c for printing images and additional information arrangement frames 202a to 202c for printing additional information of the respective images are laid out in a preset size in a printable area 200 on a print medium. In the case of the printing apparatus 100 shown in FIG. 1, the CPU 101 arranges three obtained image data in the image arrangement frames 201a to 201c and additional information corresponding to the respective image data in the additional information arrangement frames 202a to 202c.

Figure 3:
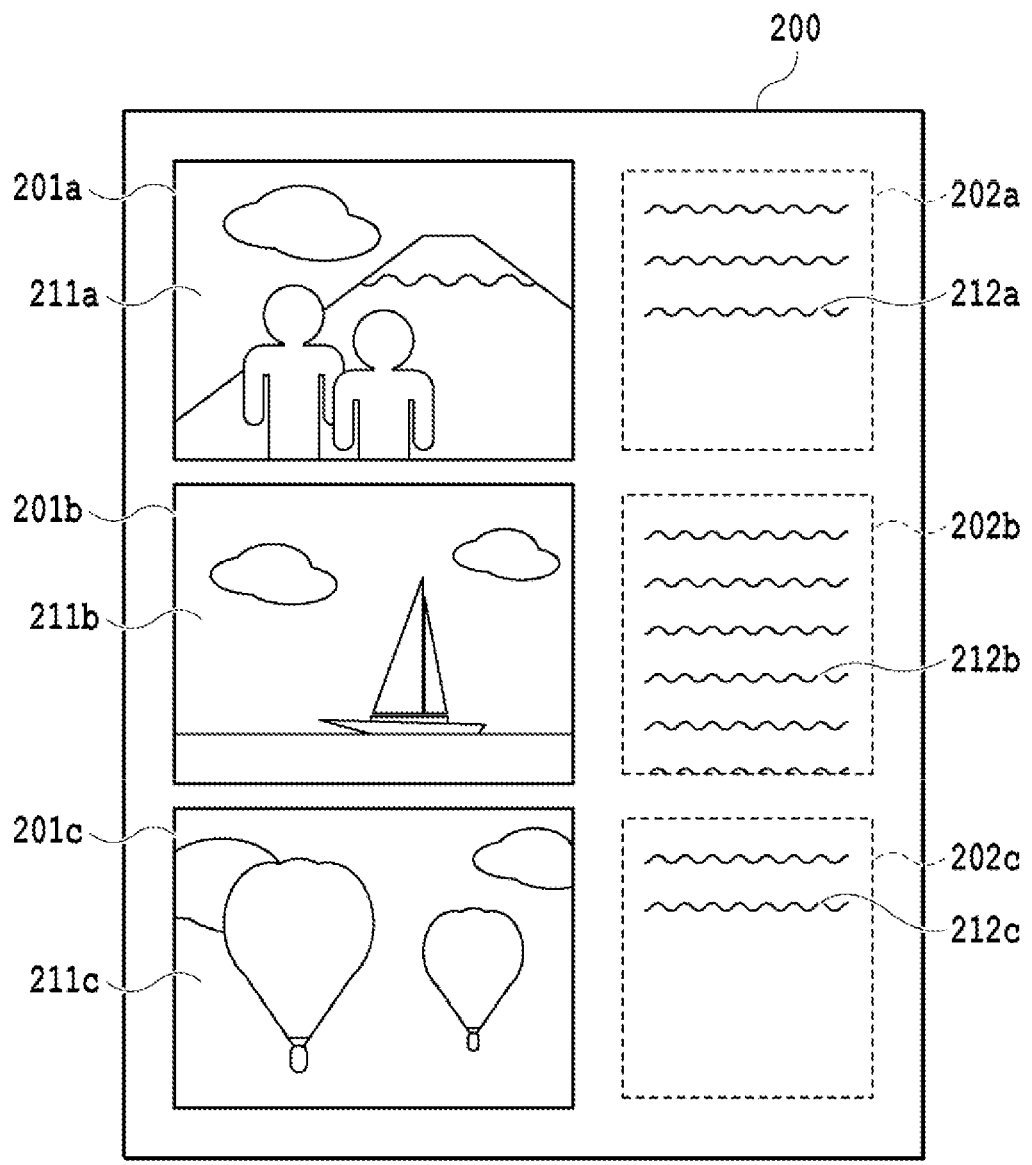
FIG. 3 is a diagram in which images and additional information are arranged in the conventional template.

FIG. 3 shows a state in which images and additional information are actually arranged and printed in the template shown in FIG. 2. An image 211a is arranged in the image arrangement frame 201a, an image 211b in the image arrangement frame 201b, and an image 211c in the image arrangement frame 201c. Additional information 212a corresponding to the image 211a is arranged in the additional information arrangement frame 202a, additional information 212b corresponding to the image 211b in the additional information arrangement frame 202b, and additional information 212c corresponding to the image 211c in the additional information arrangement frame 202c. Although the additional information arrangement frames 202a to 202c are shown by dashed lines, such frames are not necessarily printed in an actual print product.

At this time, as already described above, the amount of additional information is different for each image. For example, in the additional information arrangement frames 202a and 202c, the additional information 212a and the additional information 212c are smaller than the given areas and blanks are generated in the frames. In contrast, in the additional information arrangement frame 202b, the additional information 212b is larger than the frame and is partially not displayed. The lack of additional information can be avoided by reducing a character size of the additional information 212a as in Japanese Patent No. 04795149. Even in this case, however, non-uniformity occurs in the description of the additional information and the appearance of a print product in index print is deteriorated.

The situations described above are brought about since the additional information arrangement frames 202a to 202c are predetermined regardless of the contents and sizes of the corresponding additional information 212a to 212c. In view of the situations, the present inventors have found that it is preferable to set the size of each additional information arrangement frame individually based on the contents and sizes of a plurality of additional information to be printed on the same print medium in index print. The index print of the present embodiment will be described below in detail.

Figure 4:
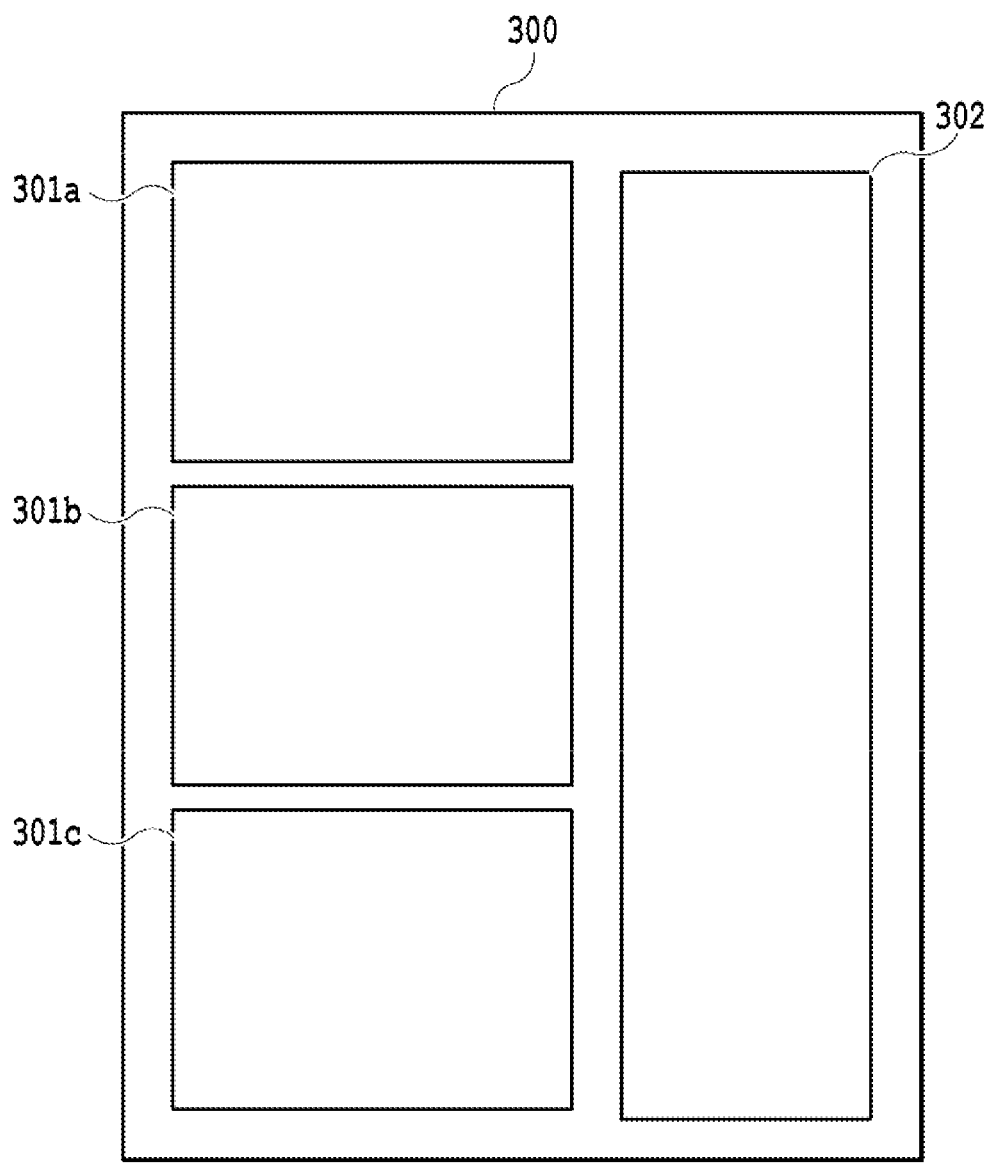
FIG. 4 is a diagram showing an example of a template used for index print.

FIG. 4 is a diagram showing an example of a template used in the index print of the present embodiment. Like FIG. 1, three images are printed together with additional information corresponding to the respective images. In the present embodiment, three image arrangement frames 301a to 301c for printing images and one additional information arrangement frame 302 for printing additional information of the images together are laid out in a predetermined size in a printable area 300 on a print medium. In this example, the additional information arrangement frame 302 extends in a direction in which the image arrangement frames 301a to 301c are arrayed. The CPU 101 arranges the three images in the image arrangement frames 301a to 301c and arranges the additional information of the respective three images in the additional information arrangement frame 302. At this time, the CPU 101 compares the amounts of description of the additional information corresponding to the respective three images and allocates the area of the additional information arrangement frame 302 to the three additional information.

Figure 5:
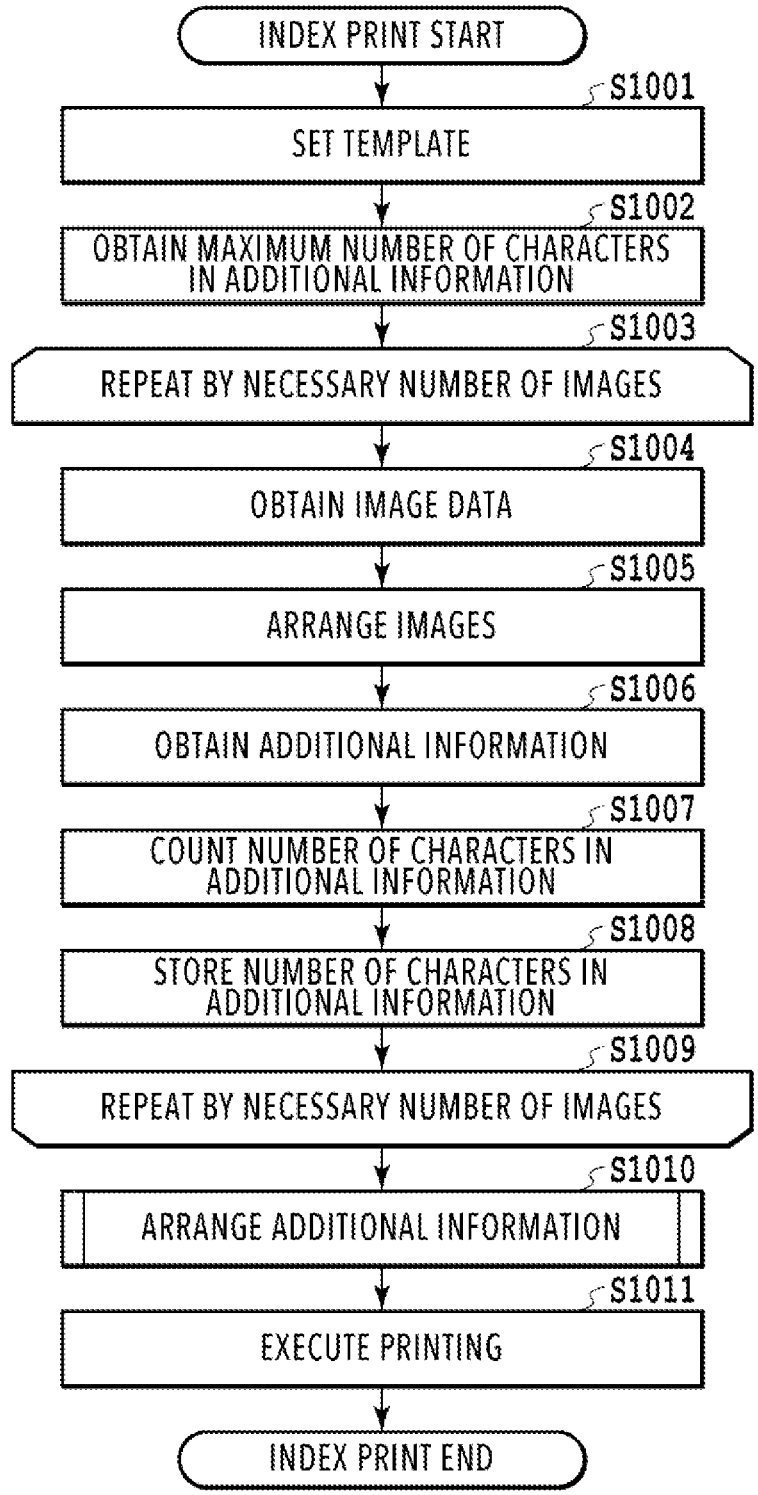
FIG. 5 is a flowchart showing processing of index print.

FIG. 5 is a flowchart showing processing executed by the CPU 101 of the present embodiment in index print. The processing is realized by the CPU 101 loading the control program stored in the program memory 103 into the data memory 104 and executing the program. For example, the processing is started by a user issuing an instruction of index print of any image group via the operation panel 115.

When the processing is started, the CPU 101 sets a predetermined template in S1001. More specifically, the CPU 101 determines the number of images to be printed on each print medium from the number of images included in an image group set via the operation panel 115 and the number of print media to be a print target and loads a corresponding template into the image memory 112. The template loaded here may be automatically determined based on the number of images included in the image group and the size of the print medium or may be determined by accepting user selection from a plurality of template candidates. In the description below, images and additional information are arranged in the template determined here.

Although FIG. 4 shows the example of the template in the case of arranging three images on one page, the template of the present embodiment is not limited to this. Four or more images may be arranged in the vertical direction and may be arranged in two or more columns. In the case of two or more columns, it is preferable that columns of image arrangement frames 301 and additional information arrangement frames 302 corresponding thereto be arranged alternately in the lateral direction. Further, the print medium is in portrait orientation in FIG. 4 but may be in landscape orientation. The description will be given of an example in which the template shown in FIG. 4 is set.

Figure 6:
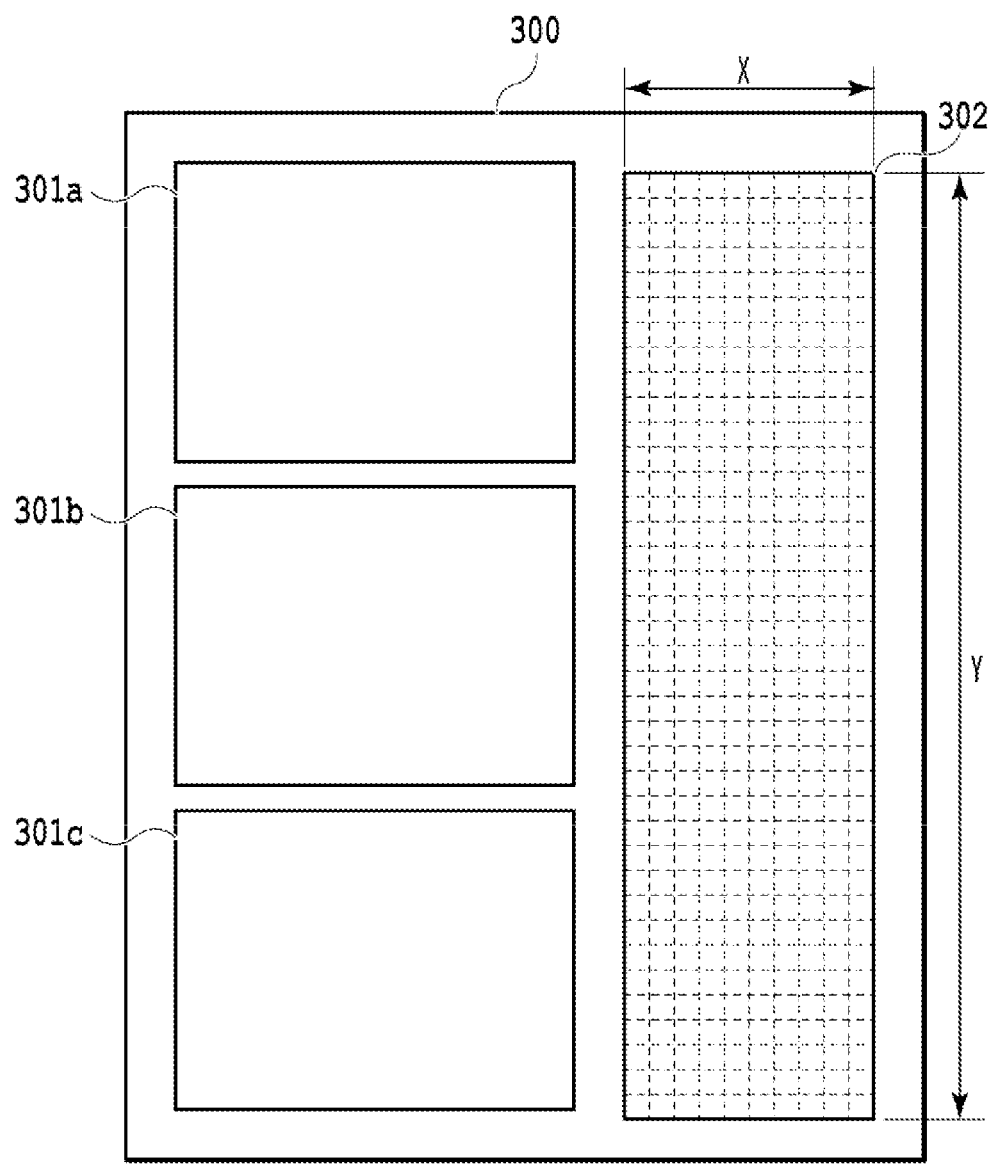
FIG. 6 is a diagram showing the number of characters included in an additional information arrangement frame.

In S1002, the CPU 101 obtains the maximum number of characters in the set additional information arrangement frame 302. As shown in FIG. 6, the maximum number of characters can be calculated by multiplying the number of characters X in the lateral direction of the additional information arrangement frame 302 by the number of characters Y in the vertical direction (X×Y).

In the flowchart of FIG. 5, the steps S1003 to S1009 are repeatedly performed by the number of images to be arranged on the same page. First, in S1004, the CPU 101 selects one image from the image group for index print as an image to be processed and obtains image data on the image to be processed. The data may be obtained from the image memory 112, the memory card 117, or the like. Although the order of obtained images is not limited, it is assumed here that the images are obtained in order of shooting date and time for example. In S1005, the CPU 101 arranges the image to be processed in an image arrangement frame, in which an image is not yet arranged, among the image arrangement frames 301a to 301c laid out in the template set in S1001. In a case where images to be processed are arranged in all the image arrangement frames on one page, an image to be processed is arranged in an image arrangement frame on the next page.

In S1006, the CPU 101 obtains additional information corresponding to the image to be processed. For example, the contents of the additional information may be, without limitation, a combination of one or more of a shooting date and time, a shutter speed, an aperture, the types of shooting camera and lens, a shooting scene, an environmental temperature, an environmental humidity, and a shooting location using the GPS.

FIGS. 7A and 7B are diagrams showing an example of the items and contents of the additional information stored as Exif information. FIG. 7A shows an example of tags of the Exif information. FIG. 7B shows an example of information stored in association with the respective tags. The additional information may be stored as the Exif information or may be stored in a different format. Alternatively, the additional information may be information obtained by further adding comments generated by a user to the Exif information. As items to be actually printed as additional information in index print, a user may be allowed to set some of the items stored as the Exif information.

In S1007, the CPU 101 counts the number of characters in the additional information obtained in S1006. In S1008, the CPU 101 stores the counted number of characters in association with the image to be processed. After the step of S1008, if the image group for index print includes an image not yet arranged in the template, the CPU 101 returns to S1003, sets the next image to be processed, and performs the processing from S1004 onward. If all the images are arranged in the template, the CPU 101 proceeds to S1010.

In S1010, the CPU 101 arranges each additional information in the additional information arrangement frame 302 based on the amounts of description of additional information corresponding to the images arranged on the same page.

Figure 8B:
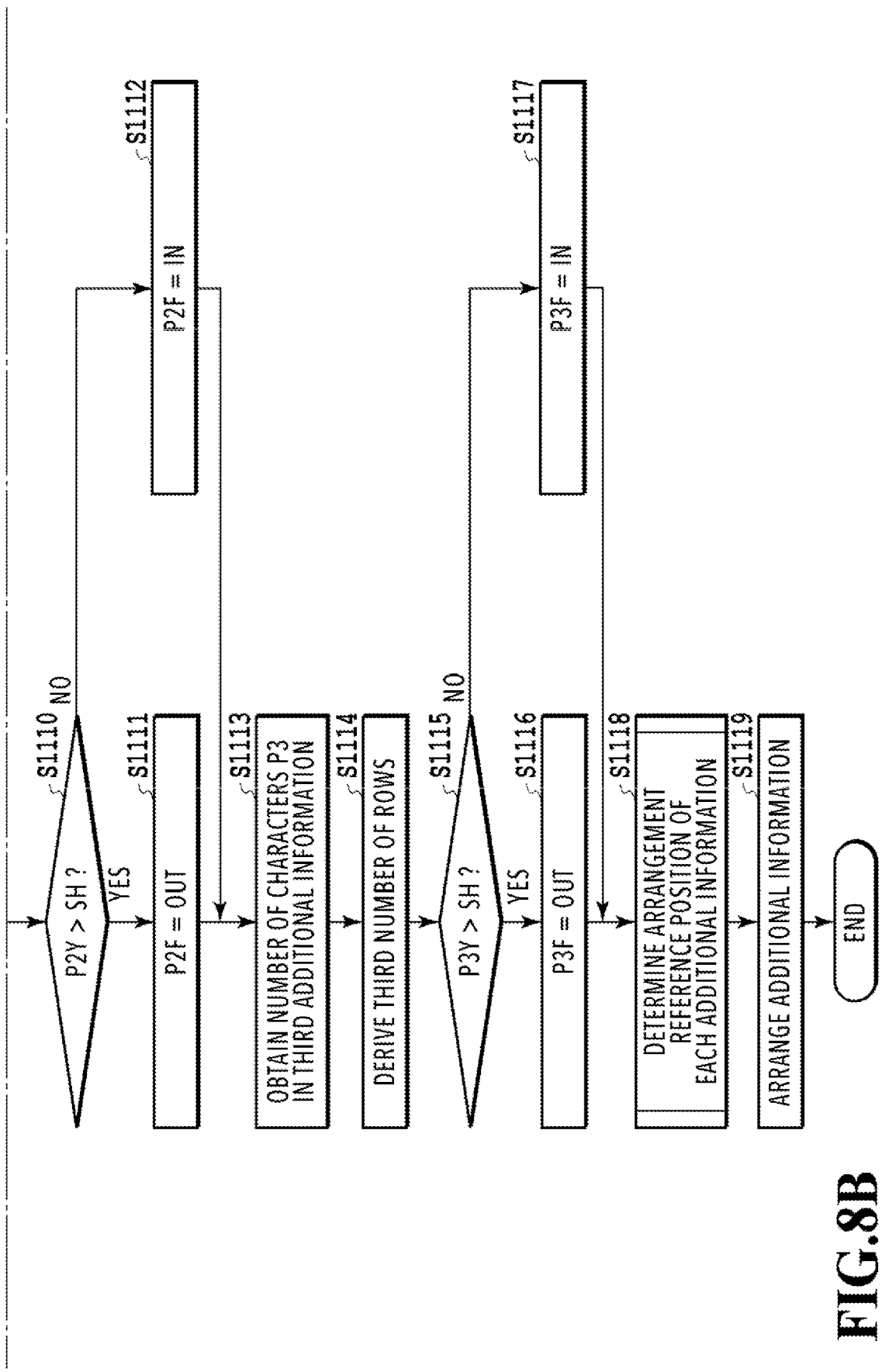
FIG. 8B is a flowchart showing arrangement processing of additional information.

FIG. 8 is a flowchart showing arrangement processing of additional information executed by the CPU 101 in S1010 of FIG. 5. FIGS. 9A to 9E are diagrams showing a specific example of the arrangement processing. The arrangement processing of additional information of the present embodiment will be described below in detail according to the flowchart of FIG. 8 with reference to FIGS. 9A to 9E. In this example, three images are arranged in a page according to the template shown in FIG. 4.

When the processing is started, the CPU 101 first obtains the number of boundaries K in S1101. The number of boundaries K means the number of boundaries between adjacent additional information in the case of arranging a plurality of additional information side by side in one additional information arrangement frame 302 like the present embodiment. In the case of describing L additional information in one additional information arrangement frame 302, the number of boundaries K is K=L−1. In this example, since three additional information are described in one additional information arrangement frame 302, the number of boundaries K is K=3−1=2. In the present embodiment, since the number of additional information in one page is equal to the number of images in one page, L is also the number of images in one page.

In S1102, the CPU 101 obtains the reference number of rows SH. The reference number of rows SH corresponds to the number of rows to be a reference amount temporarily given to each additional information among a plurality of rows included in the additional information arrangement frame 302 (the number of rows is Y). The reference number of rows SH in this example has a size substantially corresponding to one image arrangement frame. The reference number of rows SH is calculated by subtracting the number of boundaries K obtained in S1101 from the number of rows Y included in the additional information arrangement frame 302 and further dividing the result into L equal parts (SH=(Y−K)/L).

For example, in a case where the additional information arrangement frame 302 has an area of 10 characters in the column direction (X=10) and 38 characters in the row direction (Y=38) as shown in FIG. 9A, the CPU 101 divides a value obtained by subtracting the number of boundaries K=2 from the number of rows Y=38 into three equal parts (SH=(38−2)/3=12). That is, the additional information arrangement frame 302 is temporarily divided into three areas having the reference number of rows SH=12 with boundary rows 901a and 901b therebetween (see FIG. 9B).

Returning to the flowchart of FIG. 8, in S1103, the CPU 101 reads from the data memory 104 the number of characters P1 in first additional information associated with the first image of the three images. Information on the number of characters is prestored in S1008 of FIG. 5. In S1104, the CPU 101 derives the first number of rows P1Y necessary for displaying the first additional information. The first number of rows P1Y can be calculated from the number of characters P1 in the first additional information and the number of characters X in the column direction in the additional information arrangement frame 302 according to the following formula:

$$P1Y=(P1+(X-1))/X$$

In S1105, the CPU 101 compares the first number of rows P1Y with the reference number of rows SH. If P1Y>SH, the CPU 101 proceeds to S1106 and sets a first flag P1F to OUT. If P1Y≤SH, the CPU 101 proceeds to S1107 and sets the first flag P1F to IN. Here, P1F=OUT indicates that the first number of rows P1Y is greater than the reference number of rows SH and additional information of the first image cannot be entirely displayed within the reference number of rows SH. P1F=IN indicates that the first number of rows P1Y is equal to or less than the reference number of rows SH and additional information of the first image can be displayed within the reference number of rows SH.

After that, the CPU 101 executes the above processing also for the second and third images. That is, the CPU 101 sets a second flag P2F for the second image from S1108 to S1112 and sets a third flag P3F for the third image from S1113 to S1117.

Next, the CPU 101 proceeds to S1118 and determines an arrangement reference position of the first additional information, the second additional information, and the third additional information.

Figure 10:
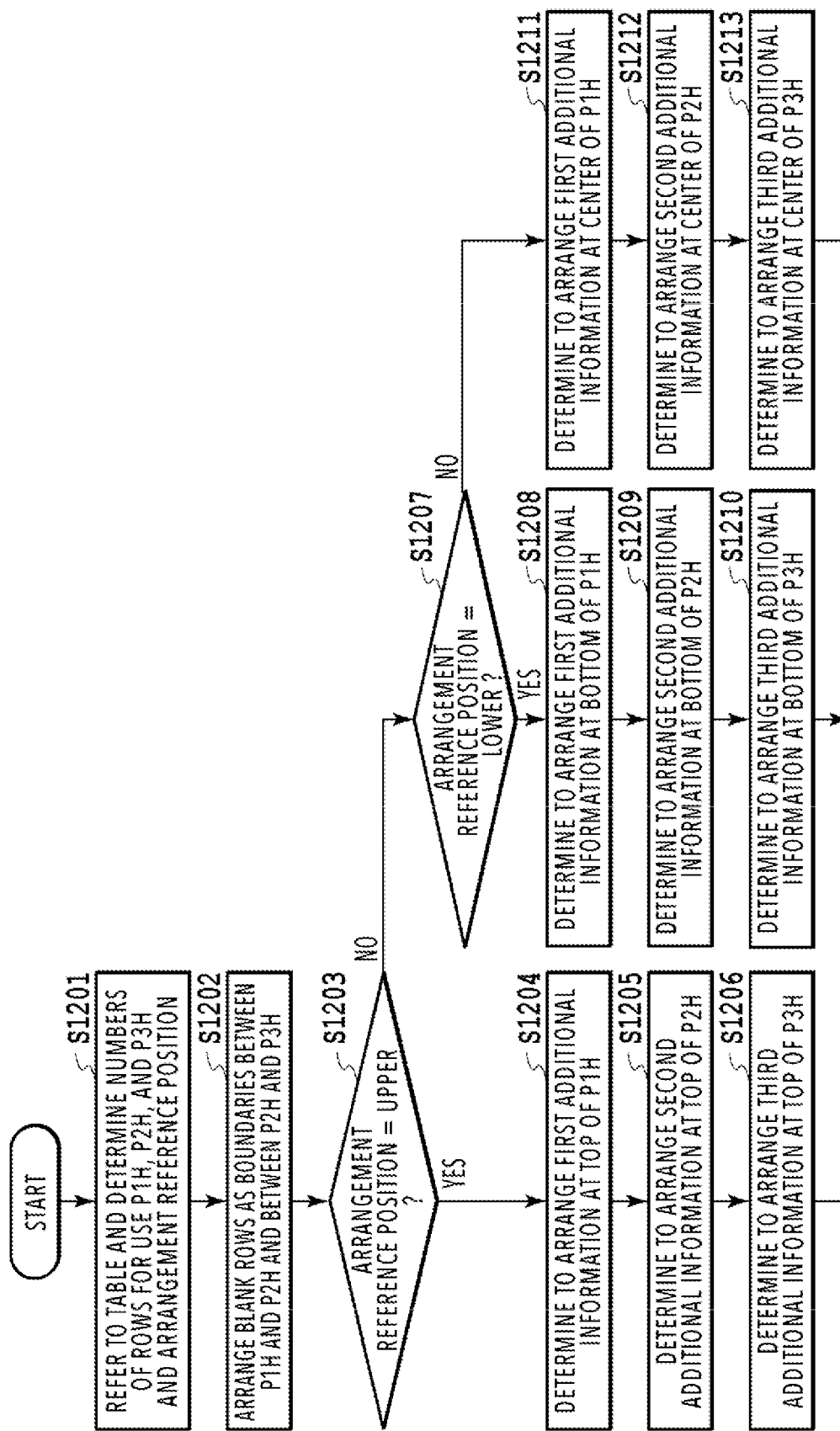
FIG. 10 is a flowchart showing the steps of determining an arrangement reference position of additional information.

FIG. 10 is a flowchart showing the steps of the CPU 101 determining the arrangement reference position of the first additional information to the third additional information in S1118 of FIG. 8. FIG. 11 is a diagram showing a table that the CPU 101 refers to in order to determine the arrangement reference position. The method of arranging the additional information will be specifically described below according to the flowchart of FIG. 10 with reference to FIG. 11.

When the processing is started, in S1201, the CPU 101 refers to the table shown in FIG. 11 and determines the first number of rows for use P1H, the second number of rows for use P2H, the third number of rows for use P3H, and the arrangement reference position based on the combination of settings of the flags P1F, P2F, and P3F. The first number of rows for use P1H, the second number of rows for use P2H, and the third number of rows for use P3H are the numbers of rows actually allocated to the first additional information, the second additional information, and the third additional information, respectively, in order to describe the respective additional information.

The arrangement reference position is determined to be any of Upper, Lower, and Center. The arrangement reference position being Upper means that the additional information is arranged at the top of the number of rows for use. The arrangement reference position being Lower means that the additional information is arranged at the bottom of the number of rows for use. The arrangement reference position being Center means that the information is described in equal numbers of rows in the vertical direction from the center row within the number of rows for use.

In S1202, the CPU 101 arranges a boundary row 901a between the first number of rows for use P1H and the second number of rows for use P2H and arranges a boundary row 901b between the second number of rows for use P2H and the third number of rows for use P3H in the additional information arrangement frame 302. The additional information arrangement frame 302 is thus divided into three areas allocated to the first additional information, the second additional information, and the third additional information, respectively.

In S1203 to S1213, the CPU 101 determines the arrangement form of the first additional information to the third additional information based on the arrangement reference position determined in S1201. A specific example will be described below with reference to FIG. 11 and FIGS. 9A to 9E.

For example, if P1F=IN, P2F=IN, and P3F=IN, the CPU 101 sets the first number of rows for use to P1H=SH, the second number of rows for use to P2H=SH, the third number of rows for use to P3H=SH, and the arrangement reference position to Upper. In this case, in S1202, the boundaries 901a and 901b are arranged as shown in FIG. 9B and "Yes"

is determined in S1203. The CPU 101 determines that the first additional information is arranged at the top of the number of rows for use P1H (S1204), the second additional information is arranged at the top of the number of rows for use P2H (S1205), and the third additional information is arranged at the top of the number of rows for use P3H (S1206).

FIG. 9C is a diagram showing an example of the arrangement state of the first additional information 902a, the second additional information 902b, and the third additional information 902c in the case where P1F=IN, P2F=IN, and P3F=IN. Each of the numbers of rows for use P1H, P2H, and P3H is less than the reference number of rows SH and each additional information is entirely arranged at the top of the reference number of rows SH.

On the other hand, if IN and OUT are mixed in the flags P1F, P2F, and P3F, the CPU 101 sets the number of rows for use of additional information with IN flag to be less than the reference number of rows SH and sets the number of rows for use of additional information with OUT flag to be greater than the reference number of rows SH. For example, if P1F=OUT, P2F=OUT, and P3F=IN, the CPU 101 sets the first number of rows for use to P1H=SH+(SH−P3Y)/2, the second number of rows for use to P2H=SH+(SH−P3Y)/2, and the third number of rows for use to P3H=P3Y (see FIG. 11). Further, the CPU 101 sets the arrangement reference position to Lower. In this case, in S1207, the CPU 101 determines "Yes." The CPU 101 determines that the first additional information is arranged at the bottom of the number of rows for use P1H (S1208), the second additional information is arranged at the bottom of the number of rows for use P2H (S1209), and the third additional information is arranged at the bottom of the number of rows for use P3H (S1210).

FIG. 9D is a diagram showing an example of the description state of the first additional information 902a, the second additional information 902b, and the third additional information 902c in the case where P1F=OUT, P2F=OUT, and P3F=IN. The number of rows for use P3H of the third additional information 902c is reduced to be less than the reference number of rows SH in line with the third number of rows P3Y and the rest of the area is allocated to the first additional information 902a and the second additional information 902b. Each additional information is arranged at the bottom within the number of rows for use.

For example, if P1F=IN, P2F=OUT, and P3F=IN, the CPU 101 sets the first number of rows for use to P1H=P1Y, the second number of rows for use to P2H=SH×3−P1Y−P2Y, and the third number of rows for use to P3H=P3Y (see FIG. 11). Further, the CPU 101 sets the arrangement reference position to Center. In this case, in S1207, the CPU 101 determines "No." The CPU 101 determines that the first additional information is arranged at the center of the number of rows for use P1H (S1211), the second additional information is arranged at the center of the number of rows for use P2H (S1212), and the third additional information is arranged at the center of the number of rows for use P3H (S1213).

FIG. 9E is a diagram showing an example of the description state of the first additional information 902a, the second additional information 902b, and the third additional information 902c in the case where P1F=IN, P2F=OUT, and P3F=IN. The number of rows for use P1H of the first additional information 902a is reduced to be less than the reference number of rows SH in line with the first number of rows P1Y and the number of rows for use P3H of the third additional information 902c is reduced to be less than the reference number of rows SH in line with the third number of rows P3Y. The rest of the area is allocated to the number of rows for use P2H of the second additional information 902b. Each additional information is arranged with its center at the middle row of the number of rows for use P1H, P2H, or P3H.

Returning to the flowchart of FIG. 8, if the arrangement reference position of each additional information is determined in S1118, the CPU 101 proceeds to S1119 and arranges the first to third additional information in the additional information arrangement frame 302 of the template according to the arrangement reference position determined in S1118. The number of rows for use is associated with each additional information. If the numbers of characters in all the additional information are within the respective numbers of rows for use, each additional information is arranged in the same character size in the information arrangement frame 302. After that, the CPU 101 returns to the flowchart of FIG. 5.

In S1010 of FIG. 5, if each additional information is arranged in the template, the CPU 101 proceeds to S1011. The CPU 101 causes the printing mechanism 111 to perform print operation according to the template in which the images and the additional information are arranged via the print control unit 110. This is the end of the processing.

According to the present embodiment described above, in the case of index print of a plurality of images, even if the images include an image with a large amount of additional information and an image with a small amount of additional information, areas for describing the additional information can be adjusted according to the amounts of description of the respective additional information. As a result, an unnecessary blank area can be reduced in a print medium for use in index print and the additional information corresponding to each image can be printed without unevenness on the print medium.

At this time, depending on the combination of the amounts of additional information, there may be a case where a necessary number of rows for use cannot be allocated and part of the additional information cannot be described within the associated number of rows for use. More specifically, for example, in the case of FIG. 9E, if the second number of rows P2Y of the second additional information 902b is greater than the allocated number of rows for use P2H, part of the second additional information 902b is not described in the additional information arrangement frame 302. In this case, the second additional information 902b may be arranged with a reduced character size to the extent that the entire additional information can be described in an area corresponding to the associated number of rows for use. That is, the character size is reduced such that more rows can be arranged within the area allocated to the arrangement of the additional information. At this time, not only the second additional information 902b but also all the other additional information may be reduced in character size. This makes it possible to describe all the additional information in the additional information arrangement frame 302 while equalizing the character size of the additional information. In either case, by adopting the arrangement method of the present embodiment, the space within the additional information arrangement frame 302 can be effectively utilized and a user can be provided with a great-looking print product without unevenness.

Other Embodiments

In the above description, substantially blank boundary rows 901a and 901b having a width of one character are provided, whereby the space within the additional information arrangement frame 302 is divided by the number of additional information. However, the boundary rows may be in a different form. For example, the boundary rows 901a and 901b may have a width of two or more characters. Further, characters or lines may be described in the boundary rows 901a and 901b so as to facilitate the recognition that there are boundaries.

As already described above, the template usable in the present invention is not limited to that shown in FIG. 4. In the template, two or more columns of image arrangement frames and additional information arrangement frames adjacent thereto may be laid out. In this case, the processing described with reference to the flowchart of FIG. 5 may be executed for each column.

As a matter of course, the table that the CPU refers to in order to determine the arrangement reference position is not limited to that shown in FIG. 11. The table may be appropriately changed according to the number of additional information for which index print is performed (that is, the number of images). The table may have any contents as long as areas for describing the respective additional information can be set based on the combination of the results of comparing the amounts of description of the respective additional information with the reference amount.

In the above description, in S1004 of FIG. 5, the image data is obtained from the image memory 112 or the memory card 117. As a matter of course, the present invention is not limited to this form. The image data may be obtained from the external apparatus 120 connected via an interface. The external apparatus 120 may be a terminal apparatus such as a personal computer, a digital camera, or a mobile phone, or may be a server apparatus or the like connected via a network circuit. The interface used for connection is not limited to wired connection and may use a wireless LAN network or near-field communication.

In the above description, the printing apparatus 100 (see FIG. 1) is used as the information processing apparatus of the present invention. However, the information processing apparatus is not necessarily the printing apparatus 100 comprising the printing mechanism 111. That is, the information processing apparatus may be a personal computer (PC) without any printing mechanism and the processing of S1001 to S1010 in the flowchart of FIG. 5 may be executed by a printer driver or print application program installed in the PC. The actual print operation (S1011) may be executed by a printing apparatus connected to the PC by transmitting the print data generated by the processing of S1001 to S1010 to the printing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-199898 filed Nov. 1, 2019, which is hereby incorporated by reference wherein in its entirety.

What is claimed is:

1. An information processing method of generating print data for printing a plurality of images and a plurality of additional information associated with the respective images on a same print medium, the information processing method comprising:

an obtaining step of obtaining image data on the plurality of images and the plurality of additional information;

an arrangement step of preparing a template in which a plurality of image arrangement frames for arranging the plurality of images individually and an additional information arrangement frame for arranging the plurality of additional information together are laid out, arranging the plurality of images in the plurality of image arrangement frames, respectively, and arranging the plurality of additional information in the additional information arrangement frame; and a generation step of generating the print data according to a result of arranging by the arrangement step, wherein the arrangement step compares each of amounts of description of the plurality of additional information with a reference amount, sets a plurality of areas for describing the respective additional information in the additional information arrangement frame based on a combination of results of the comparison in the plurality of additional information, arranges the plurality of additional information in the plurality of areas, respectively and in the template, the additional information arrangement frame extends in a direction in which the plurality of image arrangement frames are arrayed and the reference amount is an amount corresponding to one of the image arrangement frames.

2. The information processing method according to claim 1, wherein in a case where all of the amounts of description of the plurality of additional information are less than the reference amount, or in a case where all of the amounts of description of the plurality of additional information are greater than the reference amount, the arrangement step sets an area having the reference amount as each of the plurality of areas, and in a case where the plurality of additional information includes first additional information with an amount of description less than the reference amount and second additional information with an amount of description greater than the reference amount, the arrangement step sets an area less than the reference amount as an area for describing the first additional information and sets an area greater than the reference amount as an area for describing the second additional information.

3. The information processing method according to claim 1, wherein the arrangement step determines whether the plurality of additional information is arranged at a top, bottom, or center in the plurality of areas based on the combination of results of the comparison.

4. The information processing method according to claim 1, wherein the arrangement step sets the plurality of areas according to the combination of results of the comparison by referring to a table.

5. The information processing method according to claim 1, wherein the obtaining step obtains the image data on the plurality of images and the plurality of additional information from any one of an externally connected memory card, personal computer, digital camera, and mobile phone.

6. The information processing method according to claim 1, wherein the additional information is an information obtained by combining one or more of a shooting date and time of a corresponding image, a shutter speed, an aperture, a type of camera, a type of lens, a shooting scene, an environmental temperature, an environmental humidity, a shooting location, and a comment on the image.

7. The information processing method according to claim 1, wherein the additional information includes Exif information.

8. The information processing method according to claim 1, further comprising a printing step of printing the plurality of images and the plurality of additional information on the same print medium according to the print data generated by the generation step.

9. The information processing method according to claim 1, wherein character sizes of the plurality of additional information arranged in the additional information arrangement frame are controlled to be equal.

10. The information processing method according to claim 1, further comprising a changing step of changing a character size of at least one additional information of the plurality of additional information from a first character size to a second character size less than the first character size in a case where the at least one additional information having the first character size is not entirely accommodated in a corresponding image arrangement frame of the plurality of image arrangement frames.

11. An information processing apparatus which generates print data for printing a plurality of images and a plurality of additional information associated with the respective images on a same print medium, the information processing apparatus comprising:
   an obtaining unit configured to obtain image data on the plurality of images and the plurality of additional information;
   an arrangement unit configured to prepare a template in which a plurality of image arrangement frames for arranging the plurality of images individually and an additional information arrangement frame for arranging the plurality of additional information together are laid out, arrange the plurality of images in the plurality of image arrangement frames, respectively, and arrange the plurality of additional information in the additional information arrangement frame; and
   a generation unit configured to generate the print data according to a result of arranging by the arrangement unit,
   wherein the arrangement unit compares each of amounts of description of the plurality of additional information with a reference amount, sets a plurality of areas for describing the respective additional information in the additional information arrangement frame based on a combination of results of the comparison in the plurality of additional information, arranges the plurality of additional information in the plurality of areas, respectively and in the template, the additional information arrangement frame extends in a direction in which the plurality of image arrangement frames are arrayed and the reference amount is an amount corresponding to one of the image arrangement frames.

12. The information processing apparatus according to claim 11, wherein the arrangement unit compares each of the amounts of description of the plurality of additional information with a reference amount and sets the plurality of areas based on a combination of results of the comparison in the plurality of additional information.

13. An information processing method of generating print data for printing a plurality of images and a plurality of additional information associated with the respective images on a same print medium, the information processing method comprising:
   an obtaining step of obtaining image data on the plurality of images and the plurality of additional information;
   an arrangement step of preparing a template in which a plurality of image arrangement frames for arranging the plurality of images individually and an additional information arrangement frame for arranging the plurality of additional information together are laid out, arranging the plurality of images in the plurality of image arrangement frames, respectively, and arranging the plurality of additional information in the additional information arrangement frame; and
   a generation step of generating the print data according to a result of arranging by the arrangement step,
   wherein the arrangement step compares each of amounts of description of the plurality of additional information with a reference amount, sets a plurality of areas for describing the respective additional information in the additional information arrangement frame based on a combination of results of the comparison in the plurality of additional information, arranges the plurality of additional information in the plurality of areas, respectively,
   in a case where all of the amounts of description of the plurality of additional information are less than the reference amount, or in a case where all of the amounts of description of the plurality of additional information are greater than the reference amount, the arrangement step sets an area having the reference amount as each of the plurality of areas, and
   in a case where the plurality of additional information includes first additional information with an amount of description less than the reference amount and second additional information with an amount of description greater than the reference amount, the arrangement step sets an area less than the reference amount as an area for describing the first additional information and sets an area greater than the reference amount as an area for describing the second additional information.

14. The information processing method according to claim 13, wherein the arrangement step determines whether the plurality of additional information is arranged at a top, bottom, or center in the plurality of areas based on the combination of results of the comparison.

15. The information processing method according to claim 13, wherein the obtaining step obtains the image data on the plurality of images and the plurality of additional information from any one of an externally connected memory card, personal computer, digital camera, and mobile phone.

16. The information processing method according to claim 13, wherein the additional information is an information obtained by combining one or more of a shooting date and time of a corresponding image, a shutter speed, an aperture, a type of camera, a type of lens, a shooting scene, an environmental temperature, an environmental humidity, a shooting location, and a comment on the image.

17. The information processing method according to claim 13, wherein the additional information includes Exif information.

18. The information processing method according to claim 13, further comprising a printing step of printing the plurality of images and the plurality of additional information on the same print medium according to the print data generated by the generation step.

19. The information processing method according to claim 13, wherein character sizes of the plurality of additional information arranged in the additional information arrangement frame are controlled to be equal.

20. The information processing method according to claim 13, further comprising a changing step of changing a character size of at least one additional information of the plurality of additional information from a first character size to a second character size less than the first character size in a case where the at least one additional information having the first character size is not entirely accommodated in a corresponding image arrangement frame of the plurality of image arrangement frames.

\* \* \* \* \*